United States Patent
Yan et al.

(10) Patent No.: US 9,634,556 B2
(45) Date of Patent: Apr. 25, 2017

(54) CONVERTER, CONTROLLER, AND CONTROL METHOD

(71) Applicant: DELTA ELECTRONICS, INC., Taoyuan (TW)

(72) Inventors: Chao Yan, Taoyuan (TW); Li-Ping Sun, Taoyuan (TW); Zhi-Hui Ding, Taoyuan (TW); De-Sheng Guo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 137 days.

(21) Appl. No.: 14/705,982

(22) Filed: May 7, 2015

(65) Prior Publication Data

US 2016/0056730 A1  Feb. 25, 2016

(30) Foreign Application Priority Data

Aug. 20, 2014 (CN) .......................... 2014 1 0411518

(51) Int. Cl.
*H02M 7/217* (2006.01)
*H02M 1/42* (2007.01)

(52) U.S. Cl.
CPC ......... *H02M 1/4225* (2013.01); *Y02B 70/126* (2013.01)

(58) Field of Classification Search
CPC .. H02M 7/217; H02M 1/4225; Y02B 70/1441
See application file for complete search history.

(56) References Cited

U.S. PATENT DOCUMENTS

| | | | | |
|---|---|---|---|---|
| 2008/0273356 A1* | 11/2008 | Melanson | ........... | H02M 1/4225 363/47 |
| 2010/0253305 A1* | 10/2010 | Melanson | ........... | H02M 1/4225 323/282 |
| 2012/0014148 A1 | 1/2012 | Li et al. | | |
| 2012/0268090 A1* | 10/2012 | Sasaki | ................... | H02M 3/158 323/271 |

(Continued)

FOREIGN PATENT DOCUMENTS

| | | |
|---|---|---|
| CN | 201430532 Y | 3/2010 |
| CN | 101897113 B | 3/2014 |
| TW | I377774 B | 11/2012 |

(Continued)

*Primary Examiner* — Jue Zhang
(74) *Attorney, Agent, or Firm* — CKC & Partners Co., Ltd.

(57) ABSTRACT

A control method for a power converter is provided. The power converter includes an inductor, and a switch selectively turned on according to a control signal. The control method includes determining an on-time and a falling time according to a voltage information or a current information of the power converter; determining a switching period of the control signal according to the on-time, the falling time, and a resonant period corresponding to the inductor and a parasitic capacitance of the switch; adjusting the switching period by comparing the switching period with a first threshold period and a second threshold period; generating the control signal having the switching period when the switching period is greater than the first threshold period and less than the second threshold period or when the switching period is greater than the second threshold period and the power converter operates at over 50% of a rated power.

18 Claims, 10 Drawing Sheets

(56) References Cited

U.S. PATENT DOCUMENTS

2014/0078790 A1* 3/2014 Lin .................. H02M 3/33507
                   363/21.16
2014/0078798 A1* 3/2014 Turchi ................ H02M 1/4225
                   363/89

FOREIGN PATENT DOCUMENTS

| TW | I411202 B | 10/2013 |
|---|---|---|
| TW | I437808 B | 5/2014 |

* cited by examiner

CONVERTER, CONTROLLER, AND CONTROL METHOD

RELATED APPLICATIONS

This application claims priority to China Application Serial Number 201410411518.4, filed Aug. 20, 2014, which is herein incorporated by reference.

BACKGROUND

Technical Field

The present disclosure relates to a power converter. More particularly, the present disclosure relates to a control method for a power converter.

Description of Related Art

Power converters are widely utilized in many power supply applications. In different applications, the power converter can be operated in many modes, e.g., a discontinuous conduction mode (DCM), a continuous conduction mode (CCM), a boundary conduction mode (BCM), a mixed mode, etc.

Reverse recovery losses of diodes can be reduced in a power converter operating in BCM, and thus a power converter operating in BCM is able to have a higher conversion efficiency compared to a power converter operating in CCM.

However, the switching frequency of a power converter operating in BCM is varied with input voltage and load. Under low input voltage and light load conditions, the switching frequency of a power converter operating in BCM becomes very high, resulting in an increase in the losses of the internal power switches. As a result, the conversion efficiency of such a power converter is reduced.

SUMMARY

One aspect of this disclosure is to provide a control method for controlling a power converter. The power converter at least includes a switch and an inductor, in which the switch is electrically coupled to the inductor, and is selectively turned on or off according to a control signal to make the inductor store or release an energy. When the energy of the inductor is completely released, resonance occurs between the inductor and a parasitic capacitance of the switch. The control method includes the following steps: determining an on-time and a falling time according to at least one of voltage information and current information of the power converter; determining a switching period of the control signal according to the on-time, the falling time and a resonant period corresponding to the inductor and the parasitic capacitance; adjusting the switching period by comparing the switching period with a first threshold period and a second threshold period, in which the second threshold period is greater than the first threshold period; and outputting the control signal having the switching period when the switching period is greater than the first threshold period and less than the second threshold period, or when the switching period is greater than the second threshold period and the power converter operates at over 50% of a rated power.

Another one aspect of this disclosure is to provide a controller. The controller is configured to generate a control signal to control a switch of the power converter, in which the switch is coupled to an inductor, and is selectively turned on or off according to the control signal to make the inductor store or release an energy. When the energy of the inductor is completely released, resonance occurs between the inductor and a parasitic capacitance of the switch. The controller includes a sampling module, a feedback calculation module, and a forecast module. The sampling module is electrically coupled to the power converter to detect at least one of voltage information and current information of the power converter. The feedback calculation module is configured to generate an on-time according to at least one of the voltage information and the current information and a target value. The forecast module is configured to generate a falling time according to the on-time, and determine a switching period of the control signal according to the on-time, the falling time, and a resonant period corresponding to the inductor and the parasitic capacitance. The forecast module is further configured to compare the switching period with a first threshold period to adjust the switching period, and when the switching period is greater than the first threshold period, the forecast module is configured to output the control signal having the switching period.

Yet another aspect of the disclosure is to provide a power converter. The power converter includes a power stage and a controller. The power stage is configured to generate an output voltage. The power stage includes an inductor and a switch. The inductor is configured to receive a DC voltage. The switch is electrically coupled to the inductor, and configured to be selectively turned on or off according to the control signal to make the inductor store or release an energy. When the energy of the inductor is completely released, resonance occurs between the inductor and a parasitic capacitance of the switch. The controller includes a feedback calculation module and a forecast module. The feedback calculation module is configured to generate an on-time according to at least one of the voltage information and the current information of the power stage and a target value. The forecast module is configured to generate a falling time according to the on-time, and determine a switching period of the control signal according to the on-time, the falling time, and a resonant period corresponding to the inductor and the parasitic capacitance. The forecast module is further configured to compare the switching period with a first threshold period to adjust the switching period, and when the switching period is greater than the first threshold period, the forecast module is configured to output the control signal having the switching period.

In summary, the power converter, the controller, and the control method of the present disclosure are able to perform control so that the switching frequency of the power converter is maintained within a specific range under light load conditions. As a result, the switching losses of the switch are reduced, and thus the conversion efficiency of the power converter is improved.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1A:
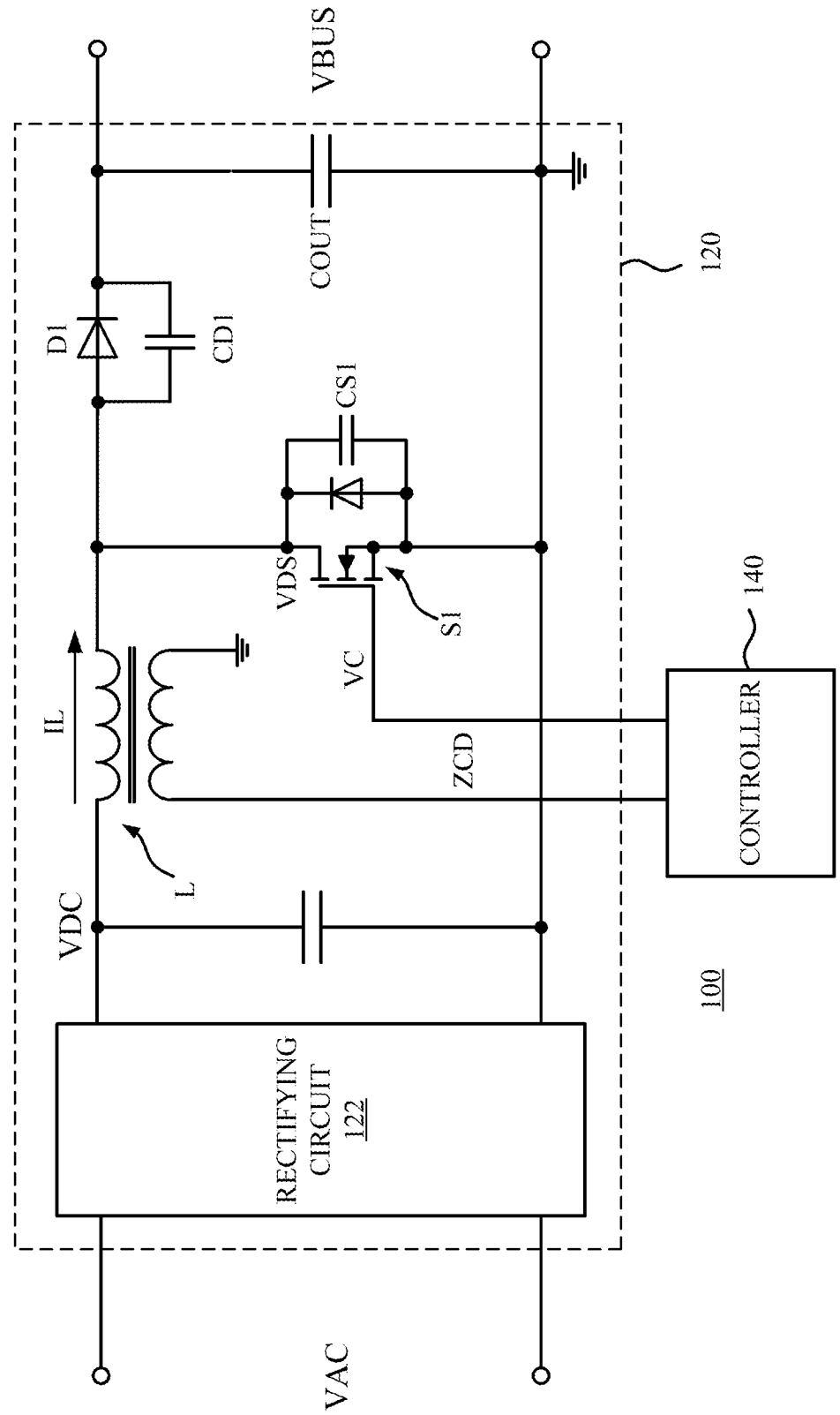
FIG. 1A is a schematic diagram of a power converter according to one embodiment of the present disclosure.

Reference will now be made in detail to the present embodiments of the disclosure, examples of which are illustrated in the accompanying drawings. However, the embodiments provided herein are intended as illustrative only since numerous modifications and variations therein will be apparent to those skilled in the art. A description of operation does not intend to limit the operation sequence. Any structures resulting from recombination of devices with equivalent effects are within the scope of the present disclosure. In addition, drawings are only for the purpose of illustration and are not drawn to scale. Wherever possible, the same reference numbers are used in the drawings and the description to refer to the same or like parts.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

Although the terms "first," "second," etc., may be used herein to describe various elements, these elements should not be limited by these terms. These terms are used to distinguish one element from another.

In this document, the term "coupled" may also be termed as "electrically coupled," and the term "connected" may be termed as "electrically connected." "Coupled" and "connected" may also be used to indicate that two or more elements cooperate or interact with each other.

Reference is made to FIG. 1A. FIG. 1A is a schematic diagram of a power converter according to one embodiment of the present disclosure. As shown in FIG. 1A, the power converter 100 includes a power stage 120 and a controller 140. The power stage 120 is configured to generate an output voltage VBUS according to an input voltage VAC, and adjust the output voltage VBUS to provide an appropriate voltage to a load according to a control signal VC. The controller 140 is electrically coupled to the power stage 120 to detect relevant electrical parameters of the power stage 120 (e.g., output voltage VBUS, inductor current IL, etc.), and generate the control signal VC according to the electrical parameters. In some embodiments, the input voltage VAC is an alternating-current (AC) signal.

Figure 1B:
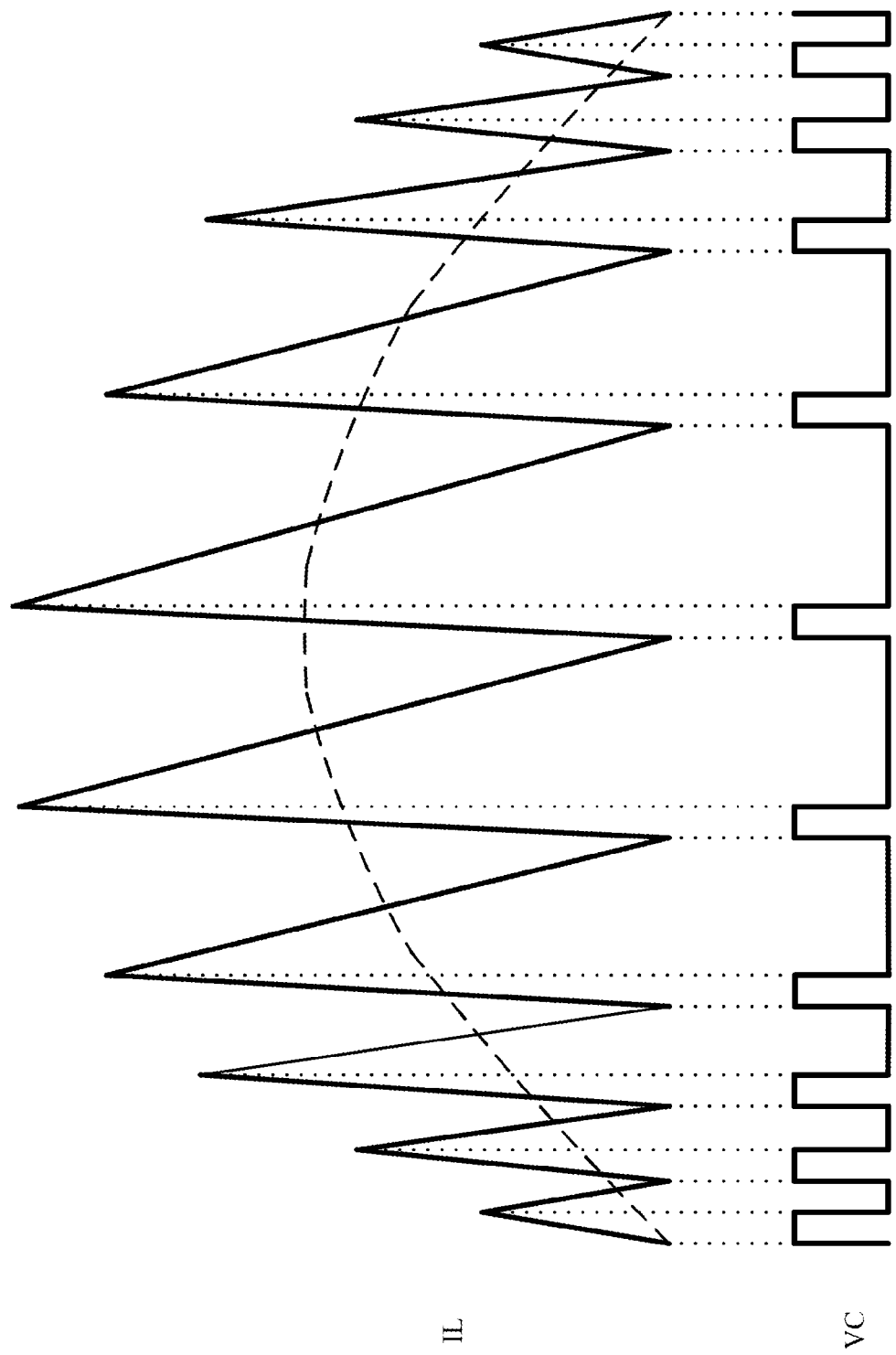
FIG. 1B is an operation waveform of the power converter shown in FIG. 1A according to one embodiment of the present disclosure.

Reference is made to both of FIG. 1A and FIG. 1B. FIG. 1B is an operation waveform of the power converter shown in FIG. 1A according to one embodiment of the present disclosure. In some embodiments, as shown in FIG. 1A, the power stage 120 is a boost power factor corrector (PFC), and the power stage 120 includes a rectifying circuit 122, an inductor L, a switch S1, a diode D1, and an output capacitor COUT.

In various embodiments, the rectifying circuit 122 may be an active circuit or a passive circuit. The rectifying circuit 122 is electrically coupled to the inductor L, and is configured to receive the input voltage VAC to generate a direct-current (DC) voltage VDC. The inductor L is configured to receive the DC voltage VDC. The switch S1 is electrically coupled to the inductor L, and is configured to be selectively turned on or off according to the control signal VC to make the inductor L store or release energy, thus adjusting the output voltage VBUS.

For illustration, as shown in FIG. 1B, the power stage 120 is configured to operate in a boundary conduction mode (BCM). In other words, the inductor current IL is reduced to zero during every switching period of the switch S1. The controller 140 is able to detect a zero crossing signal ZCD generated from the inductor current IL to determine the period of the control signal VC.

In operation, when the switch S1 is turned on, the inductor L begins to store energy, and thus the inductor current IL is increased. At this time, the inductor current IL is transmitted to ground via the switch S1, and the diode D1 is thus turned off. On the other hand, when the switch S1 turned off, the diode D1 is turned on, and the inductor L begins to release the energy. Thus, the inductor current IL is reduced. The diode D1 is turned off when the inductor current IL is reduced to zero.

In greater detail, after the energy of the inductor L is completely released, resonance occurs among the inductor L, a parasitic capacitance CS1 of the switch S1, and a parasitic capacitance CD1 of the diode D1. When the controller 140 detects that a voltage VDS between two terminals of the switch S1 changes to 0 Volts (V) (or to a trough voltage) due to resonance, the controller 140 adjusts the control signal VC to turn on the switch S1.

Figure 2:
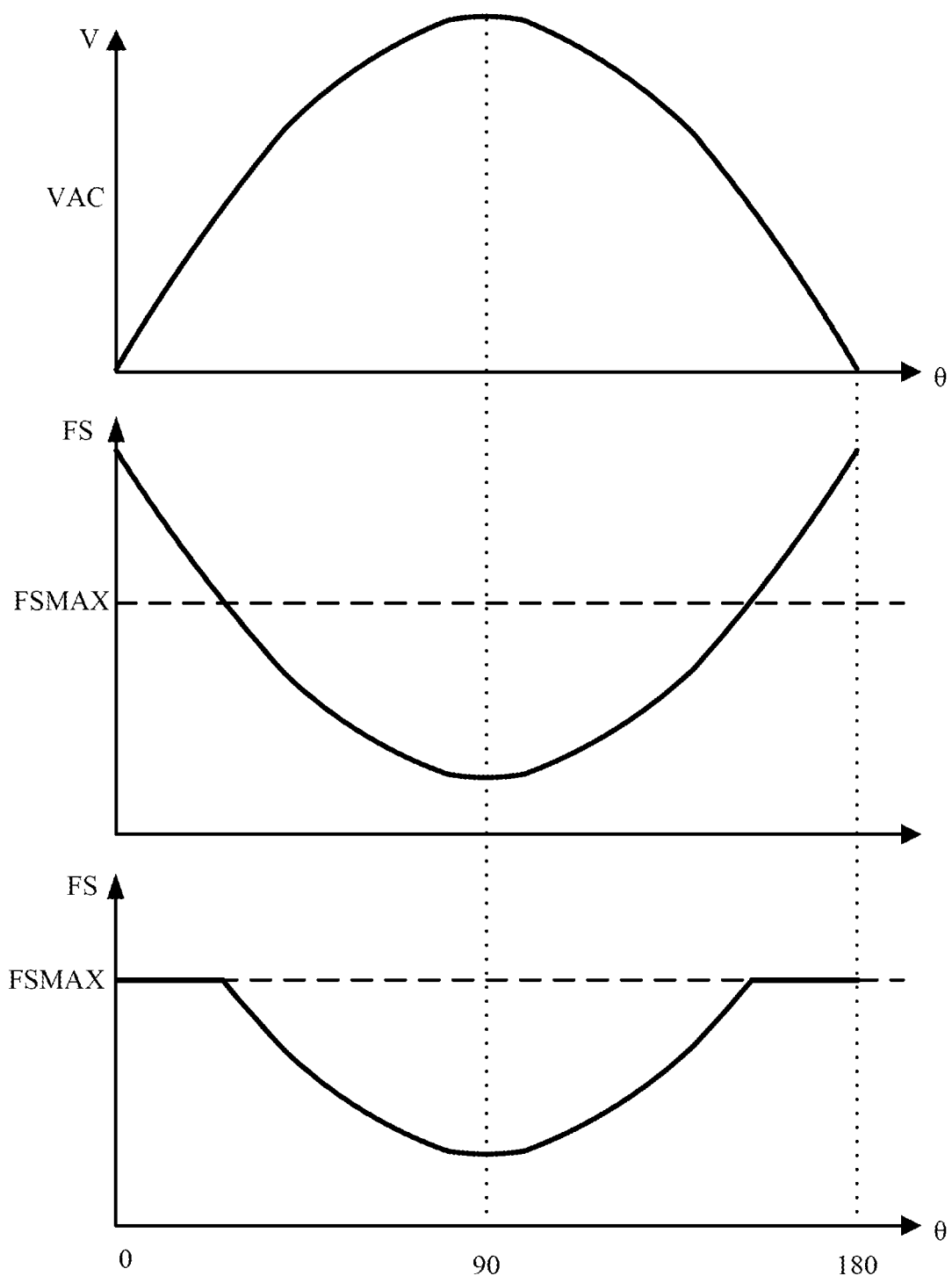
FIG. 2 is a curve diagram illustrating variations in a switching frequency of the power converter shown in FIG. 1A according to one embodiment of the present disclosure.

Reference is made to FIG. 2. FIG. 2 is a curve diagram illustrating variations in a switching frequency of the power converter shown in FIG. 1A according to one embodiment of the present disclosure. As mentioned above, when the power stage 120 operates in BCM, the switching frequency FS (i.e., the frequency of the control signal VC) of the switch S1 is related to the input voltage VAC and load. In general, the switching frequency FS of the power converter 100 operating in BCM can be determined using equation (1):

$$FS = \frac{UAC^2(1 - \sqrt{2}\,UAC\,\text{SIN}\theta/VBUS)}{2L \times PIN} \qquad (1)$$

In equation (1), PIN is an input power of the power converter 100, UAC is an effective value of the input voltage VAC, and $\sqrt{2}$UAC SIN θ is an instantaneous value of the input voltage VAC. As shown in FIG. 2, when the input voltage VAC reaches its peak value, the switching frequency FS is minimum. With a reduction in the input voltage VAC and load, the switching frequency FS is increased. When the input voltage VAC is reduced to zero, the switching frequency FS becomes increasingly higher. In actual applications, a maximum frequency limited value FSMAX is predetermined by the controller 140 to prevent the switching frequency FS from getting too high. As shown in FIG. 2, the maximum value of the actual switching frequency FS is limited to the maximum frequency limited value FSMAX.

When the power converter 100 operates in light load conditions, the loss of the switch S1 is increased if the switching frequency FS of the switch S1 is too high. Thus, a conversion efficiency of the power converter 100 is reduced. Furthermore, as shown in FIG. 1A, the controller 140 requires additional wiring to detect the zero crossing signal ZCD of the inductor current IL, resulting in an increase in the size of the inductor L, as well as in a design complexity of the power converter 100. The following paragraphs of the present disclosure describe a control method for improving the conversion efficiency of the power converter 100, and reducing the size and cost of the power converter 100.

According to FIG. 2 and equation (1), when θ=90°, the switching frequency of the power converter 100 operating in BCM is minimum, and the switching frequency FS may be calculated using equation (2) as follows:

$$FS(\theta = 90°) = \frac{UAC^2(1 - \sqrt{2}\, UAC/VBUS)}{2L \times PIN}; \quad (2)$$

$$PIN = \frac{POUT}{\eta}$$

In equation (2), POUT is an output power of the power converter 100, and η is the efficiency of the power converter 100. As is evident from equation (2), the switching frequency FS(θ=90°) is inversely proportional to the output power POUT when the input voltage VAC is fixed. In other words, the switching frequency FS(θ=90°) becomes increasingly smaller with increases in the output power POUT.

Figure 3:
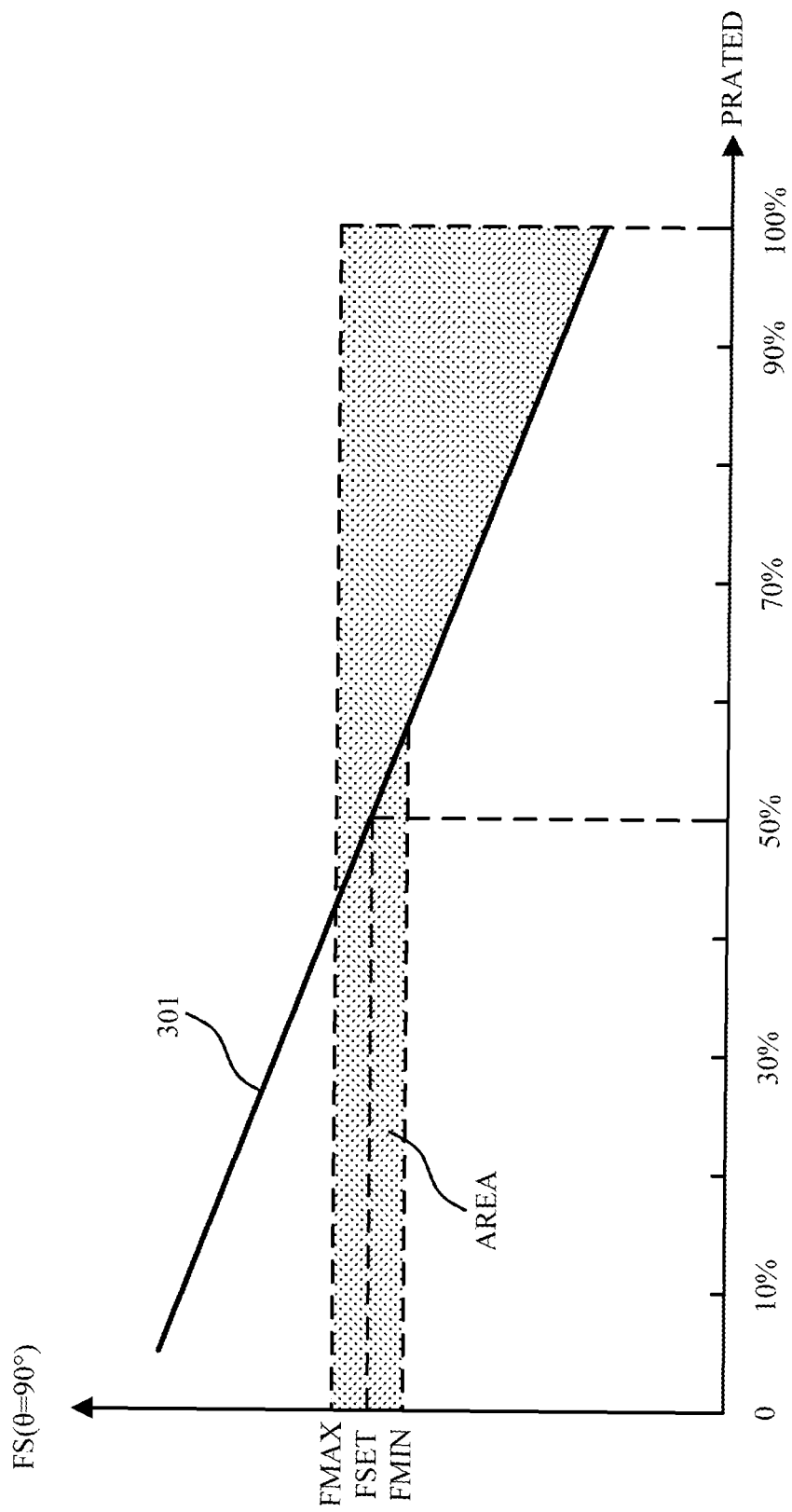
FIG. 3 is a curve diagram illustrating a variation in the switching frequency as a function of load for the power converter shown in FIG. 1A according to one embodiment of the present disclosure.

Reference is made to FIG. 3. FIG. 3 is a curve diagram illustrating a variation in the switching frequency as a function of load for the power converter shown in FIG. 1 according to one embodiment of the present disclosure. In most applications, the power converter 100 works in light load conditions. Thus, in various embodiments of the present disclosure, with a specific input voltage VAC, when the power converter 100 works in BCM and a half-load condition (i.e., 50% of the rated power), the minimum switching frequency FS (θ=90°) is defined as a reference frequency FSET.

In FIG. 3, a sloped line 301 is a curve illustrating how the switching frequency FS (θ=90°) of the switch S1 is varied with load. As shown by the sloped line 301, the minimum switching frequency FS(θ=90°) of the power converter 100 is increased with reductions in the load. When the load is 50% or lower, the minimum switching frequency FS(θ=90°) becomes very high. To overcome this problem, the present disclosure provides a control method for limiting the actual switching frequency to be within the range AREA shown in FIG. 3.

In some embodiments, when the load is less than 50% (half load), the power stage 120 is configured to work in a discontinuous conduction mode (DCM), and the switching frequency FS of the switch S1 is limited to between a threshold frequency FMAX and a threshold frequency FMIN. When the load is greater than or equal to 50%, the power converter 100 works in BCM or a mixed mode including BCM and DCM. Through such operation, the operating frequency of the power converter 100 is able to be stably limited within the range AREA, and thus the conversion efficiency of the power converter 100 is increased.

Figure 4:
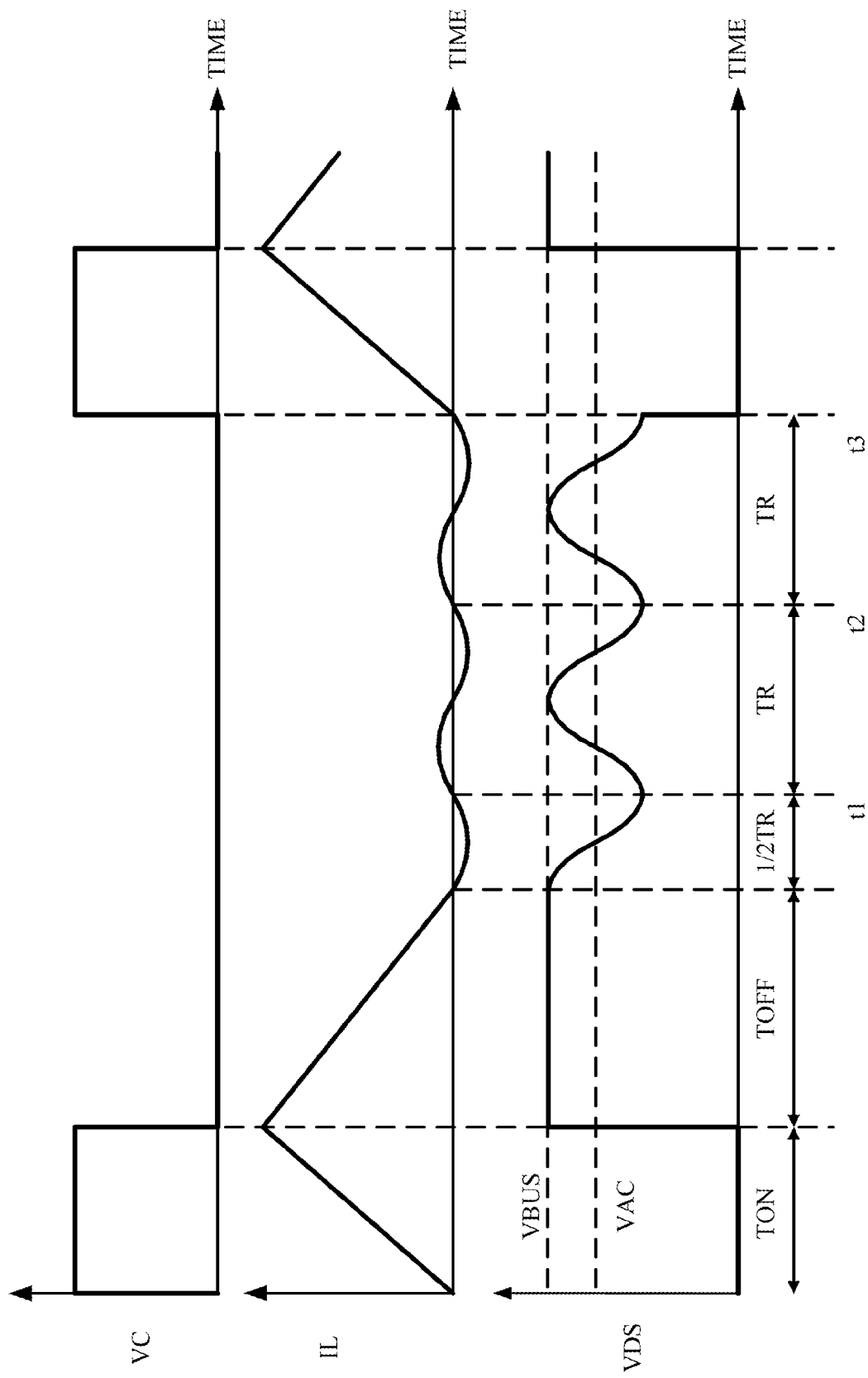
FIG. 4 is a waveform of inductor current of the power converter shown in FIG. 1A when the power converter is operating in DCM according to one embodiment of the present disclosure.

Reference is made to FIG. 4. FIG. 4 is a waveform of the inductor current of the power converter shown in FIG. 1A when the power converter is operating in DCM according to one embodiment of the present disclosure.

In FIG. 4, the voltage VDS is the drain-source voltage of the switch S1. As shown in FIG. 4, when the inductor current IL is released to zero, resonance occurs among the inductor L, the parasitic capacitance CS1, and the parasitic capacitance CD1. When the drain-source voltage VDS is at a minimum (e.g., voltages correspond to the time t1, t2, or t3), the switch S1 is turned on.

In other words, different on-times determine the different frequencies of the control signal VC (i.e., the switching frequency of the switch S1). In some embodiments, the switching frequency of the switch S1 is highest when the switch S1 is turned on during time t1, and alternatively, the switching frequency of the switch S1 is minimum when the switch S1 is turned on during time t3.

Hence, a controller (e.g., the controller 540 illustrated in FIG. 5) and a control method (e.g., the control method 600 illustrated in FIG. 6) provided by this disclosure utilizes voltage information or current information of the power converter 100 to forecast different on-times, and thus the switching frequency of the switch S1 is able to be limited in the range AREA.

Reference is made to FIG. 4. In FIG. 4, TON is the time that the switch S1 is turned on (referred to as "on-time" hereinafter), TOFF is the time for the inductor current IL to reduce to zero when the switch S1 is turned off (referred to as "falling time" hereinafter), and TR is the resonant period of the inductor L, the parasitic capacitance CS1, and the parasitic capacitance CD1. The on-time TON and the falling time TOFF satisfy equation (3), and the resonant period TR satisfies equation (4):

$$TOFF = TON \frac{|VAC|}{VBUS - |VAC|}; \quad (3)$$

$$TR = 2\pi\sqrt{L(CS1 + CD1)} \quad (4)$$

As shown in FIG. 4, to be consistent with the operations of DCM, the switching period TS (i.e., the inverse of the switching frequency FS) must satisfy equation (5), in which K is a nonnegative integer. Different values of K are able to make the switch S1 turn on at different troughs of the voltage VDS. Therefore, the controller 140 is able to limit the FS to be within the range AREA by choosing a specific K.

$$TS = TON + TOFF + (2K + 1)\frac{TR}{2} \quad (5)$$

In the following paragraphs of the present disclosure, several embodiments for limiting the switching frequency FS of the power converter 100 with the range AREA are provided, but the present disclosure is not limited to these embodiments.

Figure 5:
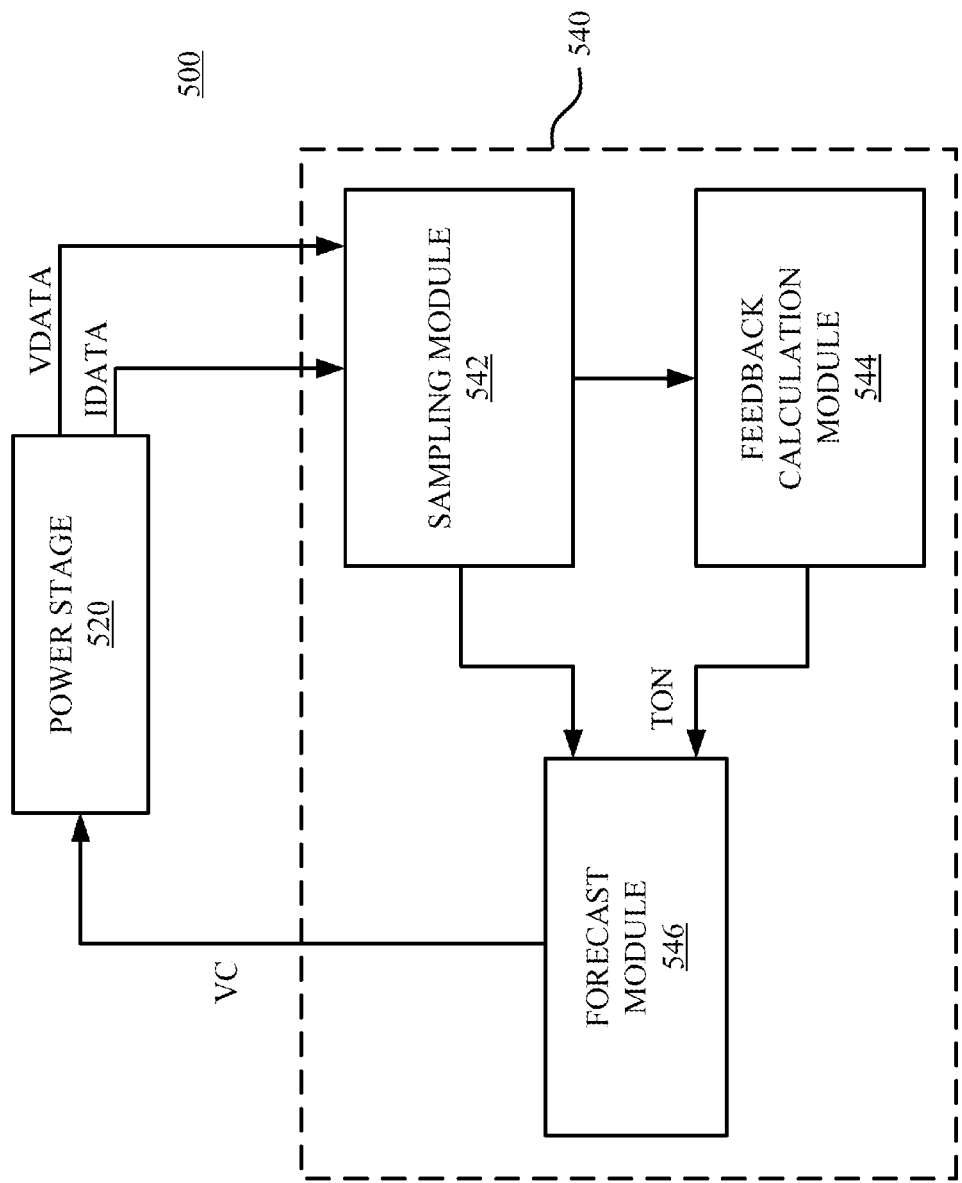
FIG. 5 is a schematic block diagram of a power converter according to one embodiment of the present disclosure.

Reference is made to FIG. 5. FIG. 5 is a schematic block diagram of a power converter according to one embodiment of the present disclosure. As shown in FIG. 5, the power converter 500 includes a power stage 520 and a controller 540.

In this embodiment, the power stage 520 can be the boost PFC shown in FIG. 1A, but is not limited in this regard. The controller 540 is electrically coupled to the power stage 520 to transmit the control signal VC for controlling the switch S1 of the power stage 520. As shown in FIG. 5, the controller 540 includes a sampling module 542, a feedback calculation module 544, and a forecast module 546.

Figure 6:
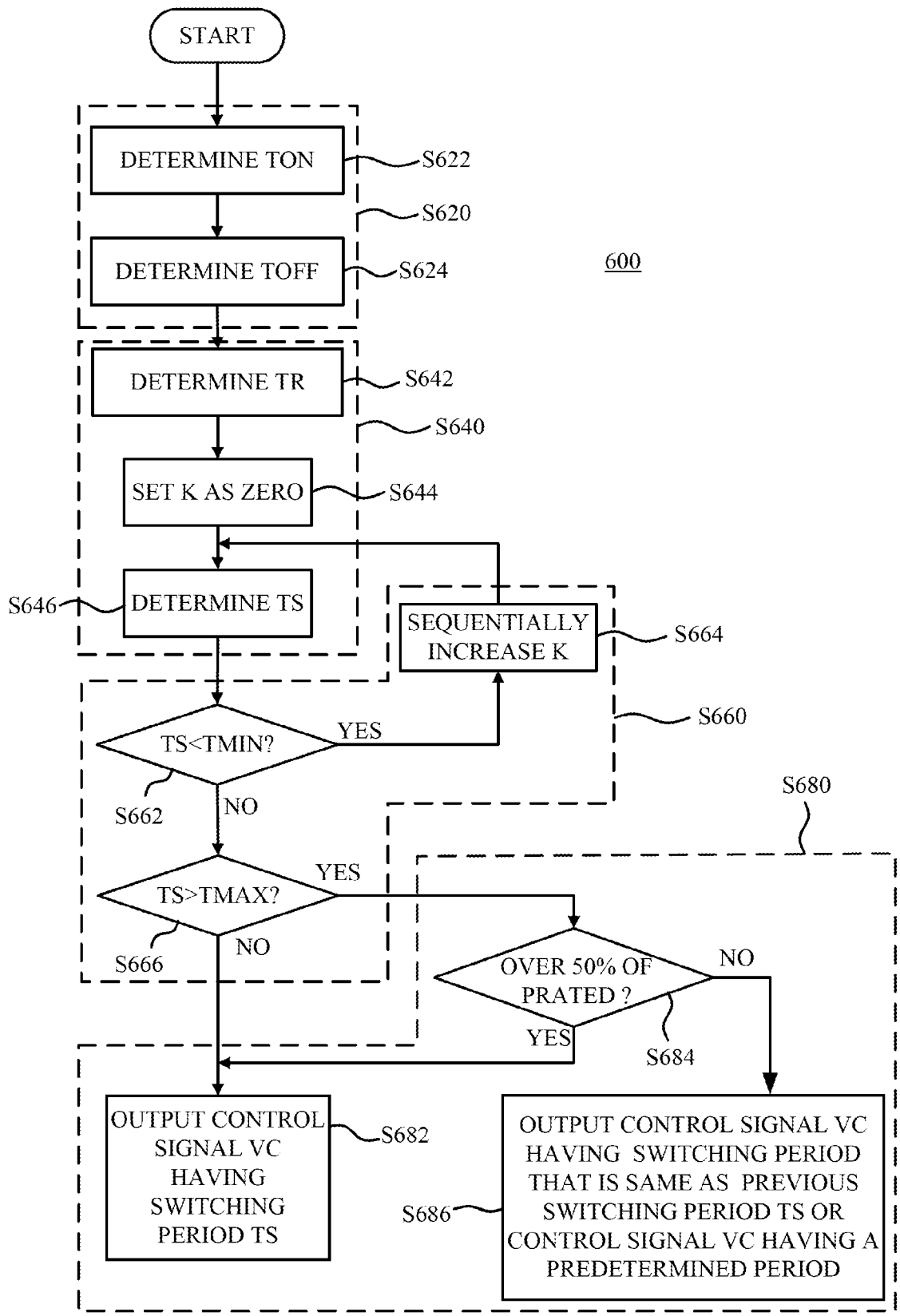
FIG. 6 is a flow chart of a control method according to one embodiment of the present disclosure.

Reference is made to both of FIG. 5 and FIG. 6. FIG. 6 is a flow chart of a control method according to one embodiment of the present disclosure. For simplicity, the operations of the power converter 500 are described with reference to the control method 600.

As shown in FIG. 6, the control method 600 includes step S620, step S640, step S660, and step S680. In step S620, the feedback calculation module 544 determines the on-time TON according to a target value and the voltage information VDATA and/or the current information IDATA of the power converter 100, and the forecast module 546 determines the falling time TOFF according to the on-time TON. In some embodiments, the target value is a target voltage and/or a target current that are expected to be output by the power converter 500.

In some embodiments, step S620 includes step S622 and step S624. As shown in FIG. 5, the sampling module 542 is electrically coupled to the power stage 520 to detect at least one of voltage information VDATA and current information IDATA of the power stage 520. In some embodiments, the voltage information VDATA includes the input voltage VAC and the output voltage VBUS of the power stage 520. In some other embodiments, the current information IDATA includes the inductor current IL passing through the inductor and a current passing through the switch 31. The feedback calculation module 544 may be a single output voltage closed-loop or a dual-loop control circuit, such as an output voltage outer loop and an inductor current inner loop, and is configured to determine the on-time TON according to the target voltage or the target current that are expected to be output by the power converter 500 (i.e., step S622). The forecast module 546 is able to utilize equation (3) to determine the falling time TOFF according to the on-time TON (i.e., step S624).

It is noted that, in some embodiments, if the voltage information VDATA is sampled by the sampling module 542, the feedback calculation module 544 performs the calculations according to the voltage information and the target voltage. Alternatively, in some other embodiments, if the current information IDATA is sampled by the sampling module 542, the feedback calculation module 544 performs the calculations according to the current information IDATA and the target current.

In step S640, the forecast module 546 utilizes equations (4) and (5) to determine the switching period TS of the control signal VC according to the on-time TON, the falling time TOFF, and the resonant period TR corresponding to the inductor L, the parasitic capacitance CS1, and the parasitic capacitance CD1.

In step S660, the forecast module 546 compares the switching period TS with each of a threshold period TMIN and a threshold period TMAX to adjust the switching period TS.

In step S680, when the switching period TS is greater than the threshold period TMIN and is less than the threshold period TMAX, or when the switching period TS is greater than the threshold period TMAX and the power converter works at over 50% of the rated power, the forecast module 546 outputs the control signal having the switching period TS.

In greater detail, step S640 may include step S642, step S644, and step S646. The resonant period TR can be obtained by testing or estimating, and is pre-stored in the forecast module 546 (i.e., step S642). The forecast module 546 utilizes equation (3) to determine the falling time TOFF, and further utilizes equation (5) to determine the switching period TS of the control signal VC according to the resonant period TR and the falling time TOFF.

In some embodiments, the forecast module 546 can set an initial value of K as zero (i.e., step S644), and determine the switching period TS of the control signal VC (i.e., step S646).

In addition, in step S660, the threshold period TMIN is the inverse of the threshold frequency FMAX, and the threshold period TMAX is the inverse of the threshold frequency FMIN. The threshold period TMAX is configured to be greater than the threshold period TMIN. In various embodiments, the threshold period TMIN and the threshold TMAX have specific relations therebetween, as shown in the following equation (6):

$$\begin{cases} TMIN = TSET - K1 \cdot TR \\ TMAX = TSET + K2 \cdot TR \\ TSET = 1/FSET; \\ 1 \le K1 + K2 \le 2; \end{cases} \quad (6)$$

In equation (6), TSET is the inverse of the reference frequency FSET, and K1 and K2 are nonnegative integers greater than 0. In some embodiments, K1 and K2 are configured to be 1. In other words, the difference between the threshold period TMIN and the threshold period TMAX is greater than or equal to twice the resonant period TR, and this may be expressed as TMAX−TMIN≥2*TR.

In some embodiments, as shown in FIG. 6, step S660 includes step S662, step S664, and step S666. The forecast module 546 compares the switching period TS determined in step S646 with the threshold period TMIN (i.e., step S662). If the switching period TS is less than the threshold period TMIN, the forecast module 546 sequentially increases K (i.e., step S664), and re-calculates the switching period TS (i.e., step S646). Thus, the forecast module 546 is able to repeatedly perform the aforesaid operations until the switching period TS is greater than the threshold period TMIN. When the forecast module 546 determines that the switching period TS is greater than the threshold period TMIN, the forecast module 546 further compares the switching period TS with the threshold period TMAX (i.e., step S666).

As shown in FIG. 6, step S680 includes step S682, step S684, and step S686. If the switching period TS is less than the threshold period TMAX, the forecast module 546 outputs the control signal VC having the switching period TS (i.e., step S682), so as to control the switches (e.g., switch S1) of the power stage 520. If the switching period TS is greater than the threshold period TMAX, the forecast module further checks whether the power stage 520 operates at over 50% of the rated power PRATED (i.e., step S684). If the power stage 520 operates at over 50% of the rated power PRATED, the forecast module 546 determines that the load is over 50%, then outputs the control signal VC having the switching period TS (i.e., step S682). Alternatively, if the power stage 520 operates at less than 50% of the rated power PRATED, this indicates that certain errors may have occurred in the calculation of the switching period TS. At this time, the forecast module 546 outputs the switching period TS having a switching period that is the same as a previous switching period TS or the control signal VC having a predetermined period, to control the power stage 520 (i.e. S686)

In some embodiments, when the load is light (i.e., less than 50% of the rated power PRATED), the forecast module 546 sets K=0, and determines the switching period TS as TS=TON+TOFF+TR/2. At this time, the forecast module 546 compares the switching period TS with the threshold TMIN. If the switching period TS is less than the threshold period TMIN, the forecast module 546 increases K by 1 to determine the switching period TS as TS=TON+TOFF+TR/2+TR. If the switching period TS is still less than the threshold period TMIN, then the forecast module 546 will increase K by 1 again to determine a new switching period TS. When the switching period TS is adjusted to be greater than the threshold period TMIN, i.e., the switching frequency FS of the control signal VC is less than the threshold frequency FMAX, the forecast module 546 furthers checks whether the switching period TS is less than the threshold period TMAX. If the switching period TS is less than the threshold period TMAX, the forecast module 546 outputs the control signal VC having the switching period TS to control the power stage 520.

Figure 7:
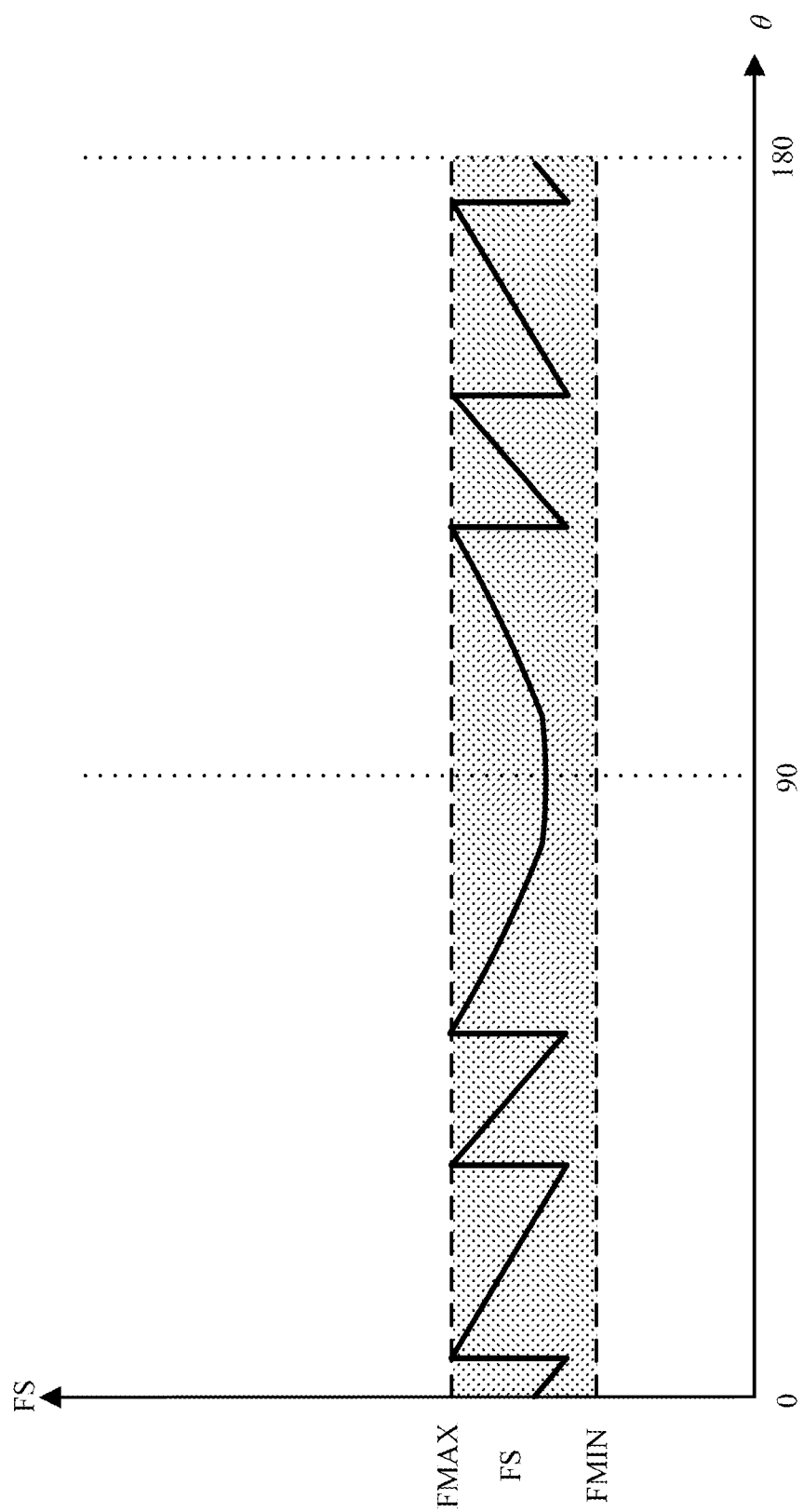
FIG. 7 is a curve diagram of a switching frequency of the power converter shown in FIG. 5 according to one embodiment of the present disclosure.

Reference is made to FIG. 7. FIG. 7 is a curve diagram of the switching frequency of the power converter shown in FIG. 5 according to one embodiment of the present disclosure. As shown in FIG. 7, when the load is light, the forecast module 546 is able to limit the switching frequency FS within [FMIN, FMAX] by performing the aforesaid operations. In other words, the switching frequency FS can be limited within the range AREA.

When the load is greater than or equal to 50%, the operations are similar to those described above and therefore a description in this regard is not given. It is evident from FIG. 3 that when the load is greater than or equal to 50%, the switching period TS may be greater than the threshold period TMAX, i.e., the switching frequency FS is less than the threshold frequency FMIN. At this time, the forecast module 546 is able to output the control signal VC having the switching period TS to limit the switching frequency FS within the range AREA.

For illustrative purposes, the embodiments above are described with the power stage 520 as the boost PFC shown in FIG. 1, but the present disclosure is not limited in this regard. In various embodiments, the power stage 520 includes a boost converter, a buck converter, a flyback converter, a forward converter, a buck-boost converter, a boost power factor corrector, or a bridgeless power factor corrector. In various embodiments, the bridgeless power factor corrector includes an H-bridge PFC, a totem-pole PFC, or a dual boost PDC, etc.

Figure 8:
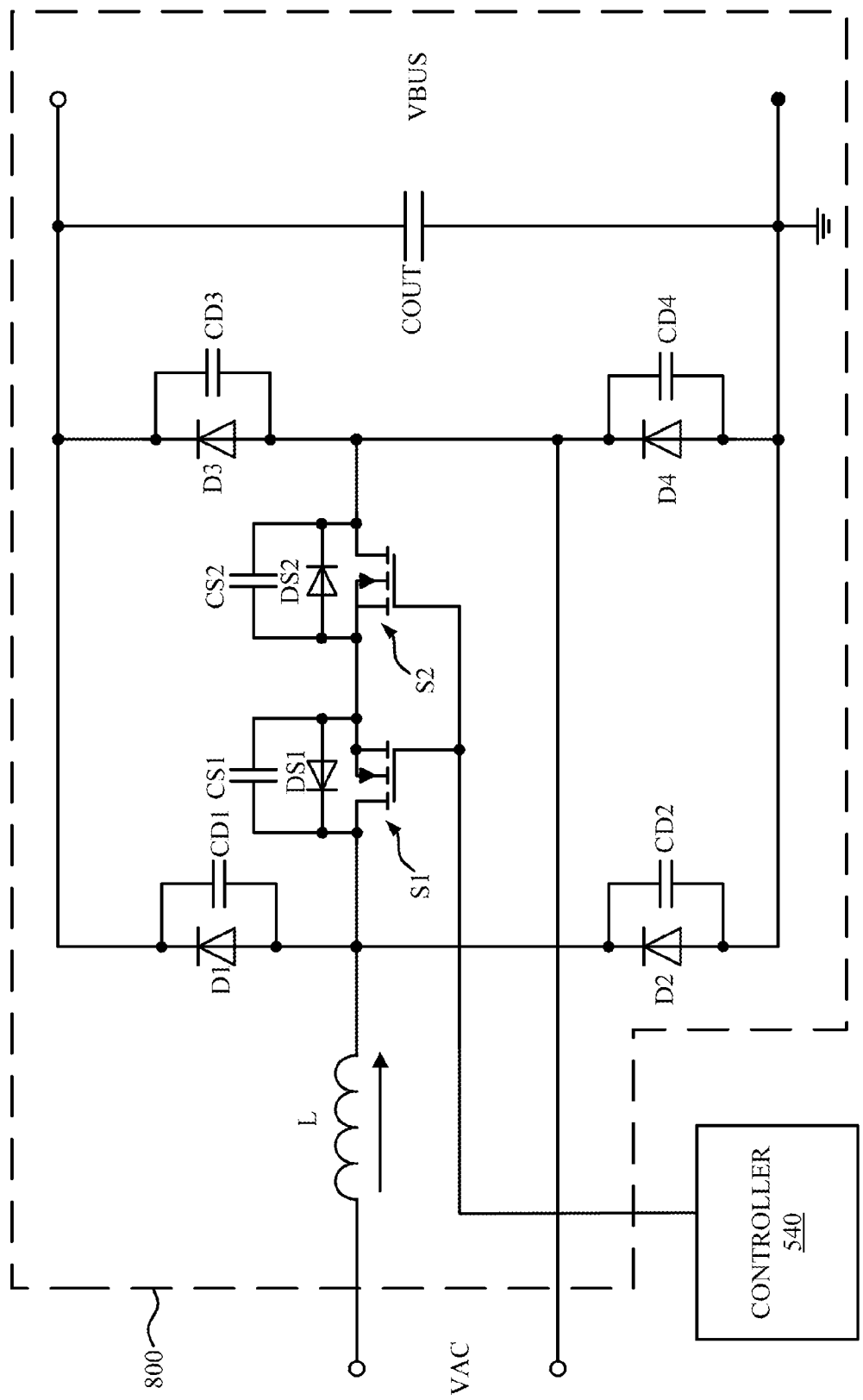
FIG. 8 is a schematic diagram of an H-bridge PFC according to one embodiment of the present disclosure.

Reference is made to FIG. 8. FIG. 8 is a schematic diagram of an H-bridge PFC according to one embodiment of the present disclosure. In some embodiments, the power stage 520 can be the H-bridge PFC 800. As shown in FIG. 8, the H-bridge PFC 800 includes a switch S1, a switch S2, a diode D1, a diode D2, a diode D3, a diode D4, and an output capacitor COUT.

During the positive half cycle of the input voltage VAC, when the switch S1 and the switch S2 are turned on, the inductor current IL is increased, and the inductor current passes through the inductor L, the switch S1, and the switch S2. When the switch S1 and the switch S2 are turned off, the inductor current IL is reduced, and the inductor current IL passes through the inductor L, the diode D1, and the diode d4 to charge the output capacitor COUT. When the inductor current IL is reduced to zero, the diode D1 is turned off. At this time, resonance occurs among the inductor L, the parasitic capacitance CD1 of the diode D1, and the parasitic capacitance CS1 of the switch S1 or the parasitic capacitance CS2 of the switch S2, in which the corresponding resonant periods satisfy equation (7):

$$\begin{cases} TR1 = 2\pi\sqrt{L(CS1+CD1)} \\ TR2 = 2\pi\sqrt{L(CS2+CD1)} \end{cases} \quad (7)$$

When resonance occurs and the direction of the inductor current IL is positive (i.e., the direction shown in FIG. 8), the corresponding resonant period is TR1 of equation (7). Alternatively, when the direction of the inductor current IL is negative, the corresponding resonant period is TR2 of equation (7).

During the negative half cycle of the input voltage VAC, when the switch S1 and the switch S2 are turned on, the inductor current IL is increased. The inductor current IL passes through the inductor L, the switch S1 and the switch S2. When the switch S1 and the switch S2 are turned off, the inductor current IL is reduced. The inductor current IL passes through the inductor L, the diode D3 and the diode D2 to charge the output capacitor COUT. When the inductor current IL is reduced to zero, the diode D2 is turned off. At this time, resonance occurs among the inductor L, the parasitic capacitance CD1 of the diode D1, and the parasitic capacitance CS1 of the switch S1 or the parasitic capacitance CS2 of the switch S2, in which the corresponding resonant periods satisfy equation (8):

$$\begin{cases} TR3 = 2\pi\sqrt{L(CS1+CD2)} \\ TR4 = 2\pi\sqrt{L(CS2+CD2)} \end{cases} \quad (8)$$

Similarly, when resonance occurs and the direction of the inductor current IL is positive, the corresponding resonant period is TR3 of equation (8). When the direction of the inductor current IL is negative, the corresponding resonant period is TR4 of equation (7).

Therefore, the resonant periods TR1, TR2, TR3, and TR4 can be obtained by testing or estimating, and pre-stored in the forecast module 546. Thus, the forecast module 546 is able to determine the switching period TS by utilizing each of the resonant periods TR1, TR2, TR3, and TR4.

Figure 9:
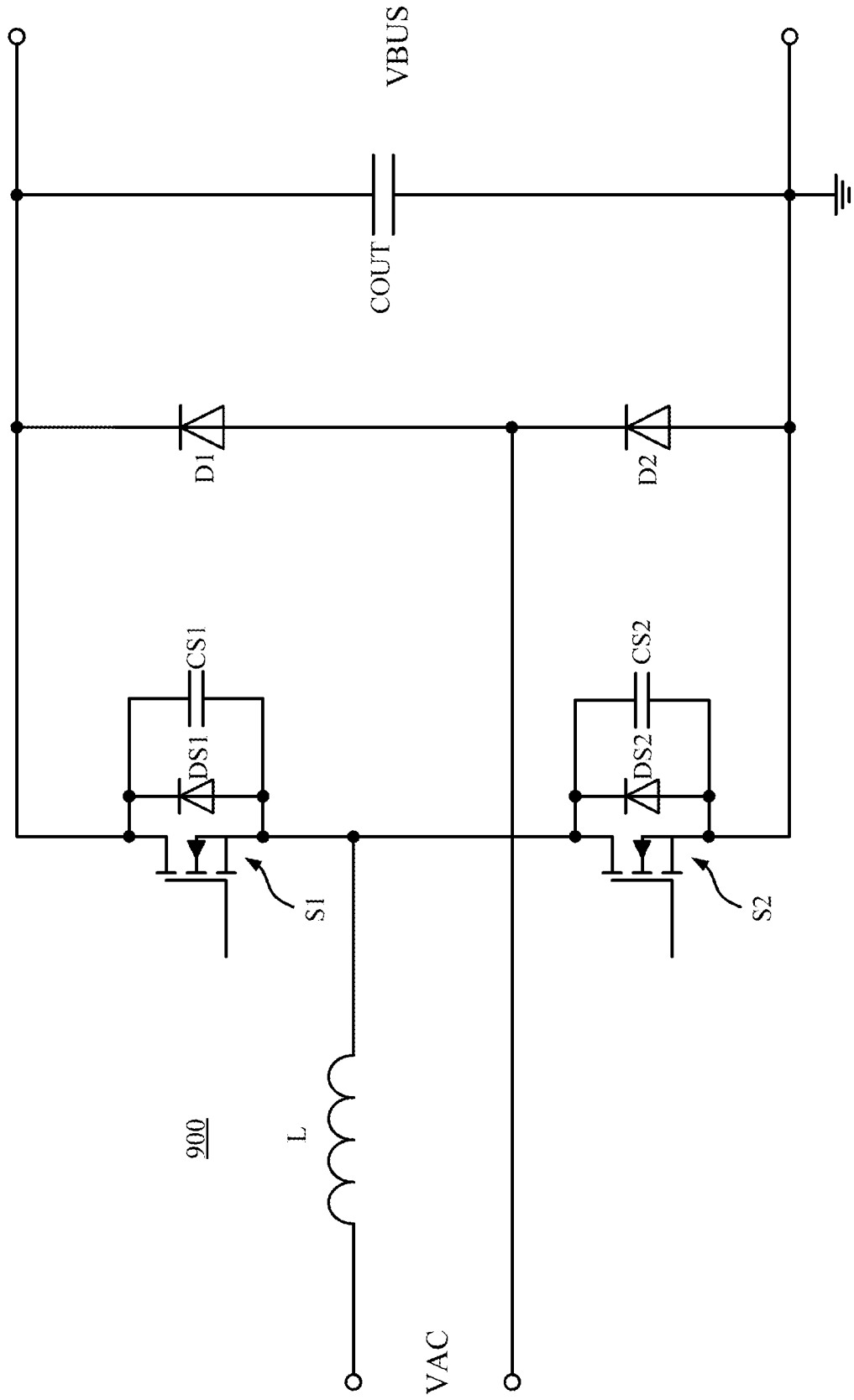
FIG. 9 is a schematic diagram of a totem pole PFC according to one embodiment of the present disclosure.

Reference is made to FIG. 9. FIG. 9 is a schematic diagram of a totem-pole PFC according to one embodiment of the present disclosure. In some other embodiments, the power stage 520 is the totem pole PFC 900. As shown in FIG. 9, the totem pole PFC 900 includes an inductor L, the switch S1, the switch S2, the diode D1, the diode D2, and an output capacitor.

During the positive half cycle of the input voltage VAC, the switch S1 is turned off. When the switch S2 is turned on, the inductor current IL is increased, and the inductor current IL passes through the inductor L, the switch S2, and the diode D2. When the switch S2 is turned off, the inductor current IL is reduced, and the inductor current IL passes through the inductor L, the parasitic diode DS1 of the switch S1, and the diode D2 to charge the output capacitor COUT.

When the inductor current IL is reduced to zero, the parasitic diode DS1 is turned off. At this time, resonance occurs among the inductor L, the parasitic capacitance CS1 of the switch S1, and the parasitic capacitance CS2 of the switch S2, and the corresponding resonant period satisfies equation (10).

Alternatively, during the negative half cycle of the input voltage VAC, the switch S2 is turned off. When the switch S1 is turned on, the inductor current IL is increased. The inductor current IL passes through the diode D2, the parasitic diode DS2 of the switch S2, and the inductor L to charge the output capacitor COUT. When the inductor current IL is reduced to zero, the parasitic diode DS2 is turned off. At this time, resonance occurs among the inductor L, the parasitic capacitance CS1 of the switch S1, and the parasitic capacitance CS2 of the switch S2, and the corresponding resonant period satisfies equation (10):

$$TR = 2\pi\sqrt{L(CS1+CS2)} \qquad (10)$$

Similarly, the resonant period TR can be obtained by testing or estimating, and pre-stored in the forecast module 546. Thus, the forecast module 546 is able to determine the switching period TS by utilizing each of the resonant periods TR.

In various embodiments of the present disclosure, the controller 540 can be implemented in software, hardware, and/or firmware. If speed and accuracy are determined to be paramount, a mainly hardware and/or firmware vehicle is selected and utilized. For example, the controller 540 is implemented in a digital control chip. If flexibility is paramount, a mainly software implementation is selected and utilized. For example, the controller 540 can be implemented in a finite state machine. Alternatively, the controller 540 can be implemented through a combination of software, hardware, and firmware. Those skilled in the art can choose one implementation for the controller 540 according to actual applications.

In summary, the power converter, the controller, and the control method of the present disclosure are able to perform control so that the switching frequency of the power converter is maintained within a specific range under light load conditions. As a result, the switching losses of the switch are reduced, and thus the conversion efficiency of the power converter is improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A control method for controlling a power converter, the power converter at least comprising a switch and an inductor, the switch being electrically coupled to the inductor, and being selectively turned on or off according to a control signal to make the inductor store or release an energy, wherein when the energy of the inductor is completely released, resonance occurs between the inductor and a parasitic capacitance of the switch, the control method comprising:

determining an on-time and a falling time according to at least one of voltage information and current information of the power converter;

determining a switching period of the control signal according to the on-time, the falling time and a resonant period corresponding to the inductor and the parasitic capacitance;

adjusting the switching period by comparing the switching period with a first threshold period and a second threshold period, wherein the second threshold period is greater than the first threshold period; and outputting the control signal having the switching period when the switching period is greater than the first threshold period and less than the second threshold period, or when the switching period is greater than the second threshold period and the power converter operates at over 50% of a rated power, wherein the first threshold period and the second threshold period have the following specific relations therebetween:

$$\begin{cases} TMIN = TSET - K1 \cdot TR \\ TMAX = TSET + K2 \cdot TR \\ TSET = 1/FSET; \\ 1 \le K1 + K2 \le 2; \end{cases}$$

where TMIN is the first threshold period, TMAX is the second threshold period, TR is the resonant period, K1 and K2 are nonnegative integers, and FSET is a minimum switching frequency of the switch when the power converter operates in a boundary conduction mode and at 50% of the rated power.

2. The control method of claim 1, wherein the step of determining the falling time comprises:

detecting the at least one of the voltage information and the current information, wherein the voltage information comprises an input voltage of the power converter or an output voltage of the power converter, and the current information comprises a current passing through the inductor or a current passing through the switch; and determining the on-time according to at least one of the voltage information and the current information; and determining the falling time according to the input voltage, the output voltage and the on-time.

3. The control method of claim 1, wherein the switching period satisfies the following equation:

$$TS = TON + TOFF + (2K+1) \times (TR/2);$$

where TS is the switching period, TOFF is the falling time, TON is the on-time, TR is the resonant period, and K is a nonnegative integer, and wherein the step of adjusting the switching period comprises:

setting an initial value of K as zero, and comparing the switching period with the first threshold period; and sequentially increasing K until the switching period is greater than the first threshold period when the switching period is less than the first threshold period.

4. The control method of claim 1, wherein the step of outputting the control signal comprises:

comparing the switching period with the second threshold period when the switching period is greater than the first threshold period; and outputting the control signal having the switching period when the switching period is less than the second threshold period.

5. The control method of claim 4, wherein the step of outputting the control signal further comprises:
checking whether the power converter operates at over 50% of the rated power when the switching period is greater than the second threshold period;
outputting the control signal having the switching period when the power converter operates at over 50% of the rated power; and
outputting the control signal having the switching period that is the same as a previous switching period or the control signal having a predetermined period when the power converter operates at less than or equal to 50% of the rated power.

6. A controller configured to generate a control signal to control a switch of the power converter, the switch being coupled to an inductor, and being selectively turned on or off according to the control signal to make the inductor store or release an energy, wherein when the energy of the inductor is completely released, resonance occurs between the inductor and a parasitic capacitance of the switch, and the controller comprises:
a sampling module electrically coupled to the power converter to detect at least one of voltage information and current information of the power converter;
a feedback calculation module configured to generate an on-time according to at least one of the voltage information and the current information and a target value; and
a forecast module configured to generate a falling time according to the on-time, and to determine a switching period of the control signal according to the on-time, the falling time, and a resonant period corresponding to the inductor and the parasitic capacitance;
wherein the forecast module is further configured to compare the switching period with a first threshold period to adjust the switching period, and when the switching period is greater than the first threshold period, the forecast module is configured to output the control signal having the switching period, wherein the first threshold period and the second threshold period have the following specific relations therebetween:

$$\begin{cases} TMIN = TSET - K1 \cdot TR \\ TMAX = TSET + K2 \cdot TR \\ TSET = 1/FSET; \\ 1 \le K1 + K2 \le 2; \end{cases}$$

where TMIN is the first threshold period, TMAX is the second threshold period, TR is the resonant period, K1 and K2 are nonnegative integers, and FSET is a minimum switching frequency of the switch when the power converter operates in a boundary conduction mode and at 50% of the rated power.

7. The controller of claim 6, wherein the voltage information comprises an input voltage and an output voltage of the power converter, the current information comprises a current passing through the inductor and a current passing through the switch, and the forecast module is configured to generate the falling time according to the input voltage, the output voltage, and the on-time.

8. The controller of claim 6, wherein the switching period satisfies the following equation:

$TS=TON+TOFF+(2K+1)\times(TR/2);$ where TS is the switching period, TOFF is the falling time, TON is the on-time, TR is the resonant period, and K is a nonnegative integer;
wherein the forecast module is configured to set an initial value of K as zero and compare the switching period with the first threshold period, and when the switching period is less than the first threshold period, the forecast module sequentially increases K until the switching period is greater than the first threshold period.

9. The controller of claim 6, wherein when the switching period is greater than the first threshold period, the forecast module is further configured to compare the switching period with a second threshold period, and output the control signal having the switching period when the switching period is less than the second threshold period.

10. The controller of claim 9, wherein when the switching period is greater than the second threshold period, the forecast module is further configured to check whether the power converter operates at over 50% of a rated power, when the power converter operates at over 50% of the rated power, the forecast module outputs the control signal having the switching period, and when the power converter operates at equal to or less than 50% of the rated power, the forecast module outputs the control signal having the switching period that is the same as a previous switching period or the control signal having a predetermined period.

11. The controller of claim 6, wherein the feedback calculation module comprises a single output voltage closed-loop or a dual-loop control circuit, wherein the dual-loop control circuit comprises an output voltage outer loop and an inductor current inner loop.

12. A power converter, comprising:
a power stage configured to generate an output voltage, the power stage comprising:
an inductor configured to receive a DC voltage; and
a switch electrically coupled to the inductor, and configured to be selectively turned on or off according to the control signal to make the inductor store or release an energy, wherein when the energy of the inductor is completely released, resonance occurs between the inductor and a parasitic capacitance of the switch; and
a controller, comprising:
a feedback calculation module configured to generate an on-time according to at least one of the voltage information and the current information of the power stage and a target value; and
a forecast module configured to generate a falling time according to the on-time, and determine a switching period of the control signal according to the on-time, the falling time, and a resonant period corresponding to the inductor and the parasitic capacitance;
wherein the forecast module is further configured to compare the switching period with a first threshold period to adjust the switching period, and when the switching period is greater than the first threshold period, the forecast module is configured to output the control signal having the switching period,
wherein when the switching period is greater than the first threshold period, the forecast module is further configured to compare the switching period with a second threshold period, and output the control signal having the switching period when the switching period is less than the second threshold period,
wherein the first threshold period and the second threshold period have the following specific relations therebetween:

$$\begin{cases} TMIN = TSET - K1 \cdot TR \\ TMAX = TSET + K2 \cdot TR \\ TSET = 1/FSET; \\ 1 \le K1 + K2 \le 2; \end{cases}$$

where TMIN is the first threshold period, TMAX is the second threshold period, TR is the resonant period, K1 and K2 are nonnegative integers, and FSET is a minimum switching frequency of the switch when the power converter operates in a boundary conduction mode and at 50% of the rated power.

13. The power converter of claim 12, wherein the controller further comprises:
a sampling module electrically coupled to the power stage to detect at least one of the voltage information and the current information, wherein the voltage information comprises an input voltage and the output voltage of the power stage, and the current information comprises a current passing through the inductor and a current passing through the switch;
wherein the forecast module is further configured to generate the falling time according to the input voltage, the output voltage and the on-time.

14. The power converter of claim 12, wherein the switching period satisfies the following equation:

$$TS = TON + TOFF + (2K+1) \times (TR/2);$$

where TS is the switching period, TOFF is the falling time, TON is the on-time, TR is the resonant period, and K is a nonnegative integer;
wherein the forecast module is configured to set an initial value of K as zero and compare the switching period with the first threshold period, and when the switching period is less than the first threshold period, the forecast module sequentially increases K until the switching period is greater than the first threshold period.

15. The power converter of claim 12, wherein when the switching period is greater than the second threshold period, the forecast module is further configured to check whether the power converter operates at over 50% of a rated power, when the power converter operates at over 50% of the rated power, the forecast module outputs the control signal having the switching period, and when the power converter operates at equal to or less than 50% of the rated power, the forecast module outputs the control signal having the switching period that is the same as a previous switching period or the control signal having a predetermined period.

16. The power converter of claim 12, wherein the feedback calculation module comprises a single output voltage closed-loop or a dual-loop control circuit, wherein the dual-loop control circuit comprises an output voltage outer loop and an inductor current inner loop.

17. The power converter of claim 12, wherein the power stage is a boost power factor corrector, and the boost power factor corrector comprises:
a rectifying circuit electrically coupled to the inductor, and configured to generate the DC voltage according to an input voltage;
a diode electrically coupled to the inductor and the switch, wherein the resonant period further corresponds to a parasitic capacitance of the diode and the parasitic capacitance of the switch; and
an output capacitor electrically coupled to the diode to output the output voltage.

18. The power converter of claim 12, wherein the power stage comprises a boost converter, a buck converter, a flyback converter, a forward converter, a buck-boost converter, a boost power factor corrector, or a bridgeless power factor corrector.

* * * * *